US010557637B2

(12) United States Patent
Lorenz et al.

(10) Patent No.: US 10,557,637 B2
(45) **Date of Patent: *Feb. 11, 2020**

(54) FACILITATING SCHEDULING OF COMFORT CONTROLLERS

(71) Applicant: EMERSON ELECTRIC CO., St. Louis, MO (US)

(72) Inventors: Thomas B. Lorenz, St. Louis, MO (US); Gregory Polce, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/035,841

(22) Filed: Jul. 16, 2018

(65) Prior Publication Data

US 2018/0320908 A1 Nov. 8, 2018

Related U.S. Application Data

(63) Continuation-in-part of application No. 14/600,389, filed on Jan. 20, 2015, now Pat. No. 10,024,565.
(Continued)

(51) Int. Cl.
*G01M 1/38* (2006.01)
*F24D 19/10* (2006.01)
(Continued)

(52) U.S. Cl.
CPC ........ *F24D 19/1048* (2013.01); *F24F 11/523* (2018.01); *F24F 11/58* (2018.01);
(Continued)

(58) Field of Classification Search
CPC .................................................. F24D 19/1048
(Continued)

(56) References Cited

U.S. PATENT DOCUMENTS 7,397,369 B2 7/2008 Zajac et al.
7,693,582 B2 4/2010 Bergman et al.
(Continued)

OTHER PUBLICATIONS

Gao, Ge, and Kamin Whitehouse. "The self-programming thermostat: optimizing setback schedules based on home occupancy patterns." Proceedings of the First ACM Workshop on Embedded Sensing Systems for Energy-Efficiency in Buildings. ACM, 2009. pp. 67-72 (Year: 2009).*
(Continued)

*Primary Examiner* — Satish Rampuria
(74) *Attorney, Agent, or Firm* — Harness, Dickey & Pierce, P.L.C.; Anthony G. Fussner

(57) ABSTRACT

Disclosed are exemplary embodiments of systems and methods for facilitating scheduling of comfort controllers such as thermostats. In an exemplary embodiment, a comfort controller is operable to control one or more configurations of a climate control system for providing climate control in a structure. The comfort controller is operable in accordance with a user-selected one of a plurality of stored weekly schedules for operation of the one or more configurations, where each of the plurality of stored weekly schedules provides a plurality of daily time slots and temperature set points, and is based on user-specifications, and where the user-selected weekly schedule is wirelessly received by and completely replaces a current operating weekly schedule on the comfort controller.

19 Claims, 9 Drawing Sheets

Related U.S. Application Data

(60) Provisional application No. 61/929,436, filed on Jan. 20, 2014.

(51) Int. Cl.

| | |
|---|---|
| ***F24F 11/523*** | (2018.01) |
| ***F24F 11/58*** | (2018.01) |
| ***F24F 11/65*** | (2018.01) |
| ***F24F 11/64*** | (2018.01) |
| ***G05D 23/19*** | (2006.01) |
| ***G05B 19/042*** | (2006.01) |
| ***G05B 15/02*** | (2006.01) |
| *F24F 110/10* | (2018.01) |

(52) U.S. Cl.

CPC .............. *F24F 11/64* (2018.01); *F24F 11/65* (2018.01); *G05B 15/02* (2013.01); *G05B 19/0426* (2013.01); *G05D 23/1904* (2013.01); *F24F 2110/10* (2018.01); *G05B 2219/2614* (2013.01); *G05B 2219/2642* (2013.01)

(58) Field of Classification Search

USPC .................................................. 700/275–306

See application file for complete search history.

(56) References Cited

U.S. PATENT DOCUMENTS

| | | | | |
|---|---|---|---|---|
| 7,696,870 | B2 | 4/2010 | Zajac et al. | |
| 7,861,941 | B2 | 1/2011 | Schultz et al. | |
| 8,239,067 | B2 | 8/2012 | Amundson et al. | |
| 8,421,621 | B2 | 4/2013 | Zajac et al. | |
| 8,442,693 | B2 | 5/2013 | Mirza et al. | |
| 8,596,550 | B2 | 12/2013 | Steinberg et al. | |
| 9,188,508 | B1 * | 11/2015 | Meyer ................. | G01M 99/005 |
| 9,201,431 | B2 * | 12/2015 | Lyle .................. | G05D 23/1902 |
| 2007/0114295 | A1 | 5/2007 | Jenkins | |
| 2008/0256475 | A1 | 10/2008 | Amundson et al. | |
| 2011/0257795 | A1 * | 10/2011 | Narayanamurthy .. | F24F 5/0046 700/277 |
| 2012/0022701 | A1 | 1/2012 | Amundson et al. | |
| 2012/0239203 | A1 * | 9/2012 | Amundson ........ | G05B 19/0426 700/276 |
| 2013/0060385 | A1 | 3/2013 | Leen et al. | |
| 2013/0099011 | A1 | 4/2013 | Matsuoka et al. | |
| 2013/0103622 | A1 | 4/2013 | Matsuoka et al. | |
| 2013/0274928 | A1 * | 10/2013 | Matsuoka .......... | G05D 23/1904 700/276 |

OTHER PUBLICATIONS

Pisharoty, Devika, et al. "Thermocoach: Reducing home energy consumption with personalized thermostat recommendations." Proceedings of the 2nd ACM International Conference on Embedded Systems for Energy-Efficient Built Environments. ACM, 2015. pp. 201-210 (Year: 2015).*

Lu, Jiakang, et al. "The smart thermostat: using occupancy sensors to save energy in homes." Proceedings of the 8th ACM conference on embedded networked sensor systems. ACM, 2010.pp. 211-224 (Year: 2010).*

*FTC Sensors, LLC* v. *Emerson Electric Co.* Complaint, Eastern District of Texas, Case 2:15-cv-02012 filed Nov. 30, 2015; 11 pages.

Woolley, Jonathan, and Therese Peffer. "Occupany Sensing Adaptive Thermostat Controls—A Market Review and Oberservations from Multiple Field Installations in University Residence Halls." ACEEE summer study. pp. 7-298 to 7-311, Retrieved from http://www.aceee.org/files/proceedings/2012/data/pap.

Kleiminger, Wilhelm, Christian Beckel, and Silvia Santini. "Opportunistic sensing for efficient energy usage in private households." Proceedings of the Smart Energy Strategies Conference. vol. 2011. 2011. pp. 1-6.

Eberwein, Adam. "Residential Smart Thermostat Test Lab—Phase One." (2014). pp. 1-49.

* cited by examiner

FACILITATING SCHEDULING OF COMFORT CONTROLLERS

CROSS-REFERENCE TO RELATED APPLICATIONS

This application is a continuation-in-part of U.S. patent application Ser. No. 14/600,389 filed Jan. 20, 2015 (and issuing as U.S. patent Ser. No. 10/024,565 on Jul. 17, 2018), which, in turn, claims the benefit of U.S. Provisional Application No. 61/929,436 filed Jan. 20, 2014. The entire disclosure of the above applications are incorporated herein by reference.

FIELD

The present disclosure generally relates to climate control systems, and more particularly (but not exclusively) to facilitating scheduling of comfort controllers.

BACKGROUND

This section provides background information related to the present disclosure which is not necessarily prior art.

Climate control systems for homes or other structures typically include thermostats and/or other controllers for controlling operation of heat pumps, furnaces, air conditioners, etc. Such controllers may be programmed by a user, e.g., to operate according to a daily and/or weekly schedule.

SUMMARY

This section provides a general summary of the disclosure, and is not a comprehensive disclosure of its full scope or all of its features.

According to various aspects, exemplary embodiments are disclosed of apparatus and methods for facilitating scheduling of comfort controllers. In an exemplary embodiment, a comfort controller is operable to control one or more configurations of a climate control system for providing climate control in a structure. The comfort controller is operable in accordance with a user-selected one of a plurality of stored weekly schedules for operation of the one or more configurations, where each of the plurality of stored weekly schedules provides a plurality of daily time slots and temperature set points and is based on user-specifications, and where the user-selected weekly schedule is wirelessly received by and completely replaces a current operating weekly schedule on the comfort controller.

Also disclosed are apparatus for providing climate control in a structure. Such apparatus may generally include a wireless-capable comfort controller operable to control at least a first configuration of a climate control system, and a computing device capable of wireless communication with the comfort controller. The computing device has a user interface for receiving user specifications in relation to operation of the comfort controller to control the first configuration. The computing device is operable to store the received user specifications in relation to first and second weekly schedules for operation of at least the first configuration, each schedule including a plurality of daily time slots and temperature set points and selectively retrievable and wirelessly transmissible to the comfort controller to completely replace a weekly schedule currently in use by the comfort controller to control at least the first configuration, whereby the comfort controller is selectively configurable to control the first configuration of the climate control system using either the first weekly schedule or second weekly schedule.

In another exemplary embodiment, a computer-performed method of providing climate control in a structure generally includes receiving, via a user interface of a computing device, user specifications for control by a comfort controller of a climate control system of the structure, the user specifications including a plurality of daily time slots and temperature set points. The method includes storing first and second sets of user specifications in relation to first and second weekly schedules for operation by the comfort controller of at least a first configuration of the climate control system, each of the first and second weekly schedules associated with a name, and the first and second weekly schedules including the plurality of daily time slots and temperature set points received via the user interface. The method also includes, in response to a user selection of one of the stored first and second weekly schedules, retrieving the selected weekly schedule based on the name associated with the selected schedule and transmitting the selected weekly schedule to the comfort controller to completely replace a weekly schedule currently in use by the comfort controller to control at least the first configuration, whereby the comfort controller uses the selected weekly schedule in place a weekly schedule currently in use by the comfort controller to control at least the first configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
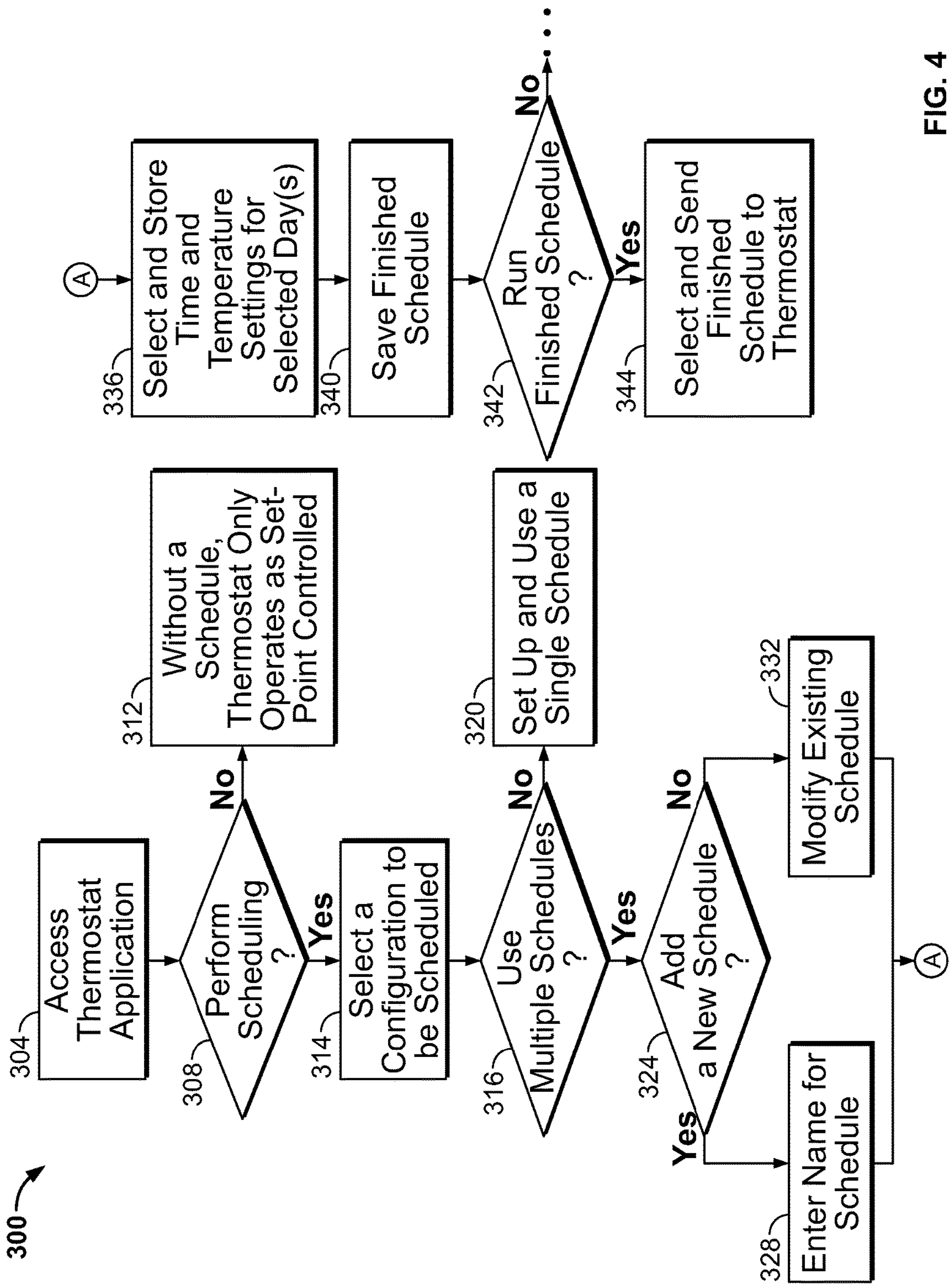

FIG. 4 is a flow diagram of a method of scheduling operation of a comfort controller in accordance with one example implementation of the present disclosure; and FIG. 5A-5L are example screenshots of graphical user interfaces displayed on a computing device (e.g., smart phone, tablet, etc.) in relation to scheduling operation of a comfort controller in accordance with one example implementation of the present disclosure.

DETAILED DESCRIPTION

Example embodiments will now be described more fully with reference to the accompanying drawings.

The inventors hereof have recognized that climate control system users would like to (1) program a thermostat or other comfort controller for operation according to a schedule, (2) have the ability to change the thermostat or comfort controller to operate according to a different program, setting, or configuration, and (3) thereafter have the ability to quickly return to the previous schedule. Accordingly, the inventors have developed and disclose herein exemplary embodiments of apparatus and methods for providing climate control in a structure using a comfort controller. In one example embodiment, a thermostat or other comfort controller is operable to control one or more configurations of a climate control system for providing climate control in a structure. The thermostat is operable in accordance with a user-selected one of a plurality of stored weekly schedules for operation of the one or more configurations, where each of the plurality of stored weekly schedules provides a plurality of daily time slots and temperature set points and is based on user-specifications, and where the user-selected weekly schedule is wirelessly received by and completely replaces a current operating weekly schedule on the thermostat. Exemplary embodiments in accordance with the present disclosure are contemplated in relation to various types of comfort controllers, including but not limited to thermostats.

Figure 1:
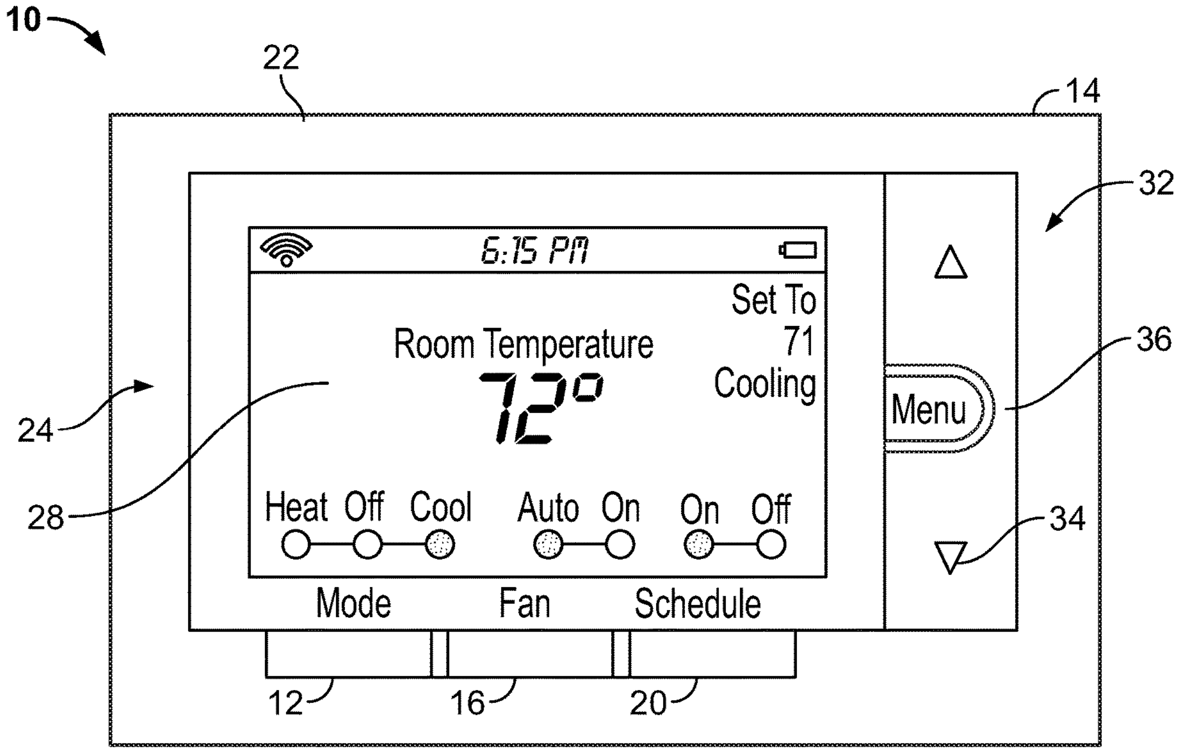
FIG. 1 is a diagram of a thermostat in accordance with one example implementation of the present disclosure.

With reference now to the figures, and in various implementations, FIG. 1 illustrates an exemplary embodiment of a comfort controller, e.g., a thermostat 10 embodying one or more aspects of the present disclosure. The thermostat 10 is for controlling a climate control system (not shown) in a residence. Various aspects of the disclosure, however, could be directed to thermostats configured for use in other structures and/or environments. Additionally or alternatively, various aspects of the disclosure could be directed to comfort controllers other than or in addition to thermostats. The thermostat 10 may be configured to receive power from one or more power source types, including but not limited to a connection to a climate control system transformer, a power stealing circuit, one or more batteries, etc.

The thermostat 10 has a housing 14 with a front cover 22 and includes a user interface 24 that includes a display screen 28. The display screen 28 is configured to indicate various environmental conditions detected in the residence and to show various settings that have been programmed into the thermostat 10. In some embodiments, the display screen 28 may include a touch screen whereby a user, e.g., an owner or resident of the residence, may enter and/or change such settings. In the present example embodiment, the display screen 28 is a segmented display. Other types of non-touch screens could be provided in other embodiments.

The user interface 24 also includes a plurality of manually operable setting options 32 that may be touch-selected by the user. Up and down buttons 34 allow the user to increase or decrease a current temperature set-point. A menu button 36 may be touched to provide a number of menu items for user selection. A mode button 12 allows the user to select operation of a particular configuration of the climate control system, e.g., a heating configuration or a cooling configuration. A fan button 16 allows the user to select automatic or constant operation of a climate control system fan. A schedule button 20 may be pressed to switch a currently selected schedule on or off. Apart from receiving button-entered inputs, the user interface 24 does not provide a keyboard or other means whereby the user may enter data manually into the thermostat 10.

Figure 2:
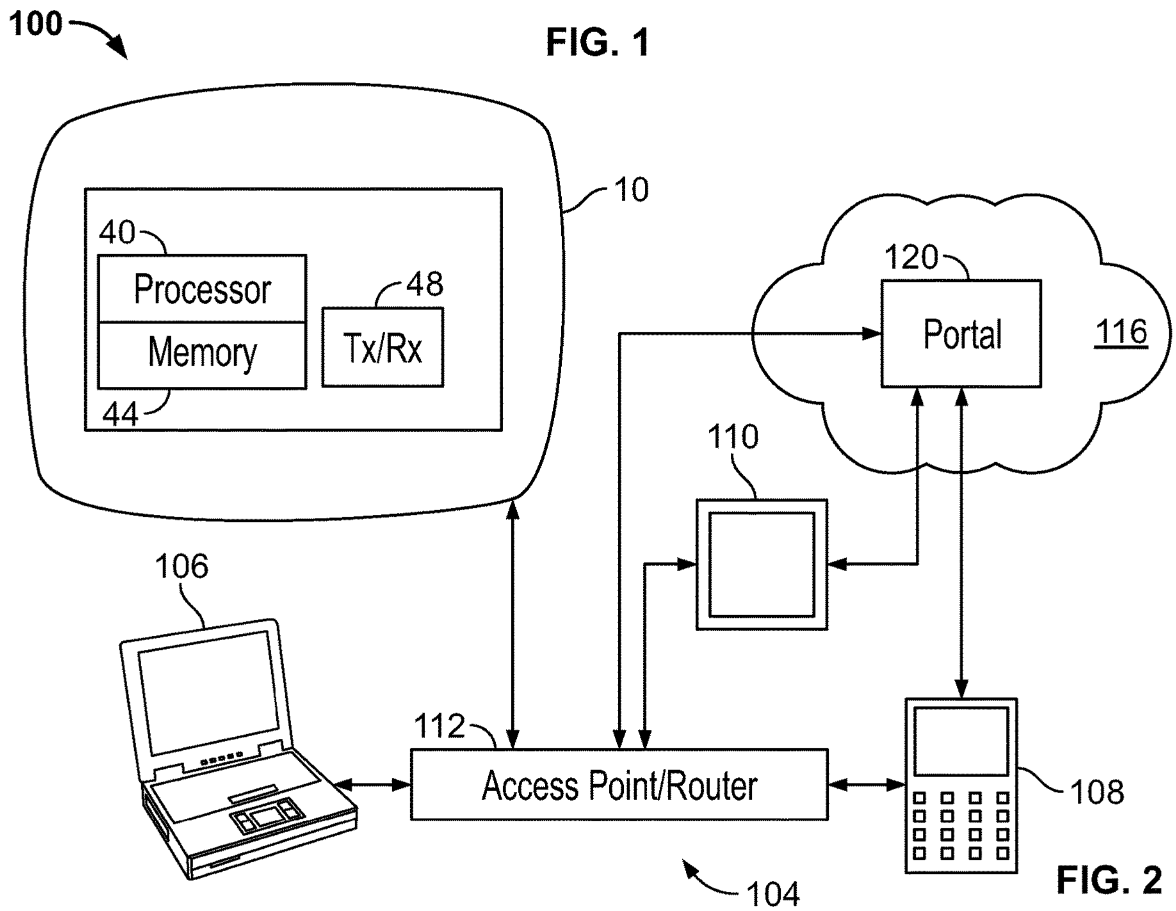
FIG. 2 is a diagram of a home network in accordance with one example implementation of the present disclosure.

Thus in various implementations, a user may pair the thermostat 10, e.g., with the user's home network for wireless communication. The user then may use a smart phone, tablet, or other computing device to wirelessly program the thermostat 10 for operation, e.g., according to a weekly schedule selected from a plurality of weekly schedules created by the user (e.g., based on user-specifications, etc.) and stored for subsequent use, where each stored weekly schedule includes, provides, etc., a plurality of daily time slots and temperature set points (e.g., based on user-specifications, etc.). FIG. 2 shows the thermostat 10 and an example network 100, e.g., a home network of the user, including the thermostat 10 in accordance with an example implementation of the present disclosure. The thermostat 10 includes a microprocessor 40 and memory 44. The thermostat 10 is capable of performing wireless communication through a network interface 48. At least one wireless-enabled user computing device 104 is connectible in the network 100 and may include, e.g., a laptop computer 106, a smart phone 108, and/or a tablet 110. Computing devices 104 may additionally or alternatively include, e.g., home computers, personal computers (PCs), microprocessors, etc. The network 100 may also include, for example and without limitation, an access point/router 112 in communication with a wide-area network (WAN), e.g., the Internet 116.

In various embodiments, a homeowner may have a user account, e.g., with an energy management services provider or utility. The homeowner may use such an account, e.g., to track and/or manage energy usage in the home. In various embodiments, the user account is accessible through a web portal 120. Thus the homeowner may use a user-interface-equipped computer device 104, e.g., the laptop computer 106, smart phone 108, and/or tablet 110, to remotely and/or locally track and/or manage energy usage in the home through the thermostat 10.

In various embodiments of the disclosure, the user may use a user-interface-equipped computing device such as the tablet 110, smart phone 108, and/or laptop computer 106 to specify, save, store, and/or select one or more schedules for operating the thermostat 10. A user interface may include, without limitation: a visual display providing input elements that can be activated, e.g., by touch, keypad, mouse, joystick, etc., an aural interface providing instructions and/or prompts for voice response, etc. Many types of user interfaces could be used whereby a user may enter, save, and/or select specifications in relation to operation of the thermostat 10. In various implementations, a user may save, store, etc. such specifications, schedules, etc. in a server, e.g., made available through an energy management services provider or utility, available in the "cloud", etc.

Figure 3:
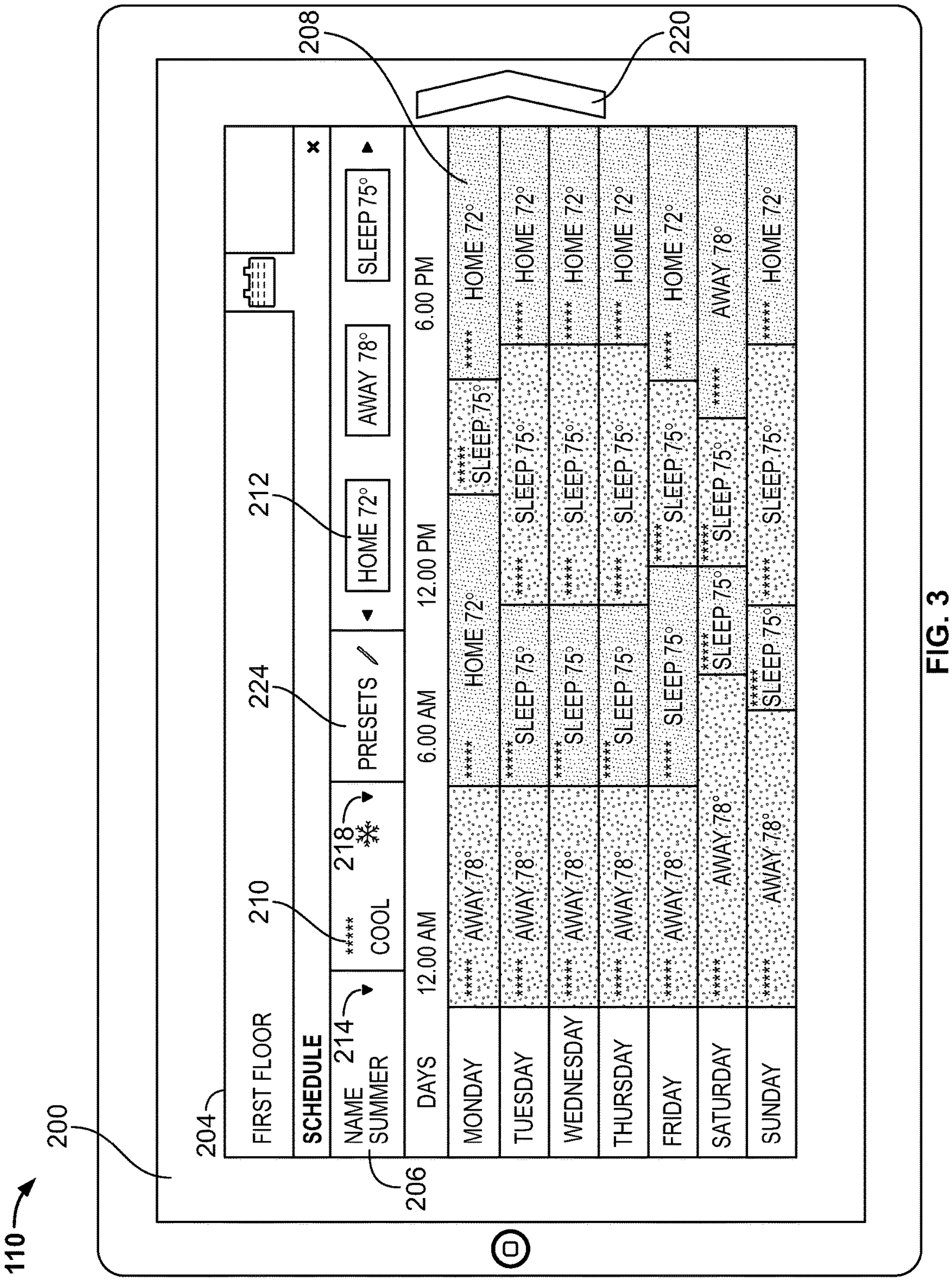
FIG. 3 is an example screenshot of a schedule displayed on a user interface of a computing device in accordance with one example implementation of the present disclosure.

One example embodiment of a user interface in accordance with various implementations of the disclosure is shown in FIG. 3. The user interface includes, e.g., a touch screen 200 of a computing device such as the tablet 110. A software application may be executed to create, select and/or display one or more schedules for climate control in the user's home. In some embodiments, the user may download the software application, e.g., to the tablet 110 or other computing device, e.g., from the web portal 120. Additionally or alternatively, the tablet 110 may access the software application as a web service through the web portal 120, etc. In some embodiments, a software application is made available through a user energy management account with an energy management services provider, e.g., through the web portal 120. In various embodiments, a software application may be made available, e.g., for execution on or through the user's smart phone 108, tablet 110, laptop computer 106, and/or other computing device 104 that has a user interface.

Each schedule may have a name by which the schedule may be stored, associated, identified, and/or retrieved. As shown in FIG. 3, an example schedule 204 is a weekly schedule and has the name "Summer" in a name field 206 displayed on the touch screen 200. The example weekly schedule 204 provides a plurality of daily time slots 208 and temperature set points (e.g., the various 72-degree, 75, degree, and/or 78-degree set points shown in FIG. 3 for the various daily time slots for each day of the week, etc.), e.g., for a week-long period. The weekly schedule 204 can be replaced (i.e., completely replaced) by another weekly schedule providing a plurality of daily time slots and temperature set points on the touch screen 200, e.g., by a user activating a screen area 214 to display a drop-down menu and selecting the name of another schedule displayed in the menu (by which the schedule may be retrieved). In some implementations, the user may activate an area (not shown) on the touch screen 200 to cause a currently displayed schedule to be activated at the thermostat 10 and/or other controller to which that schedule relates.

A configuration indicator 210 indicates whether the schedule pertains, e.g., to a heating configuration or to a cooling configuration. However, it should be appreciated that the schedule need not necessarily be specific to a heating configuration (e.g., a heating schedule for a winter seasoned, etc.) or a cooling configuration (e.g., a cooling schedule for a summer season, etc.). Rather, the schedule may be pertain to an automatic mode (as discussed below), such that the schedule may pertain to both a heating configuration and a cooling configuration of the climate control system. In this manner the schedule may be based on user-preferences independent of any particular season. In any case, a user may change the configuration, e.g., by activating a screen area 218 to display a drop-down menu and selecting the name of another configuration displayed in the menu. The schedule 204 also provides a set 224 of "Preset" activation areas 212 for storing temperature settings that the user may wish to associate with occupancy conditions in the home. For example, a user may use the areas 212 to preset, e.g., a temperature of 72 degrees for "home," a temperature of 78 degrees for "away," etc. A user may, for example, preset a desired "Sleep" temperature by using temperature "up" or "down" indicators (not shown) on the touch screen 200 to select the desired temperature and then pressing the "Sleep" activation area 212 to save the desired temperature for future use. When the user later wishes to use the preset "Sleep" temperature in a schedule, the user may press the "Sleep" activation area 212 to specify that temperature at a selected place in the schedule.

The weekly schedule 204 can be viewed in its entirety on the touch screen 200 by activation of an arrow 220 to shift the schedule on the touch screen 200. It can be appreciated that the tablet 110 provides more display space and capability for user entry of data than would, e.g., a segmented display provided on a typical thermostat. While the schedule 204 is a weekly schedule providing a plurality of daily time slots and temperature set points, in various other embodiments, a schedule may be provided and displayed that covers any desirable length of time. Thus, a schedule may be programmed for more than a week, less than a week, for a month, etc.

A user may, e.g., touch a time slot 208 to activate the slot and may change its value, e.g., by using a keypad (not shown) of the tablet 110. When the user has finished specifying a weekly schedule 204, the user may activate the tablet 110 to cause the entire weekly schedule 204 to be stored, e.g., in a memory of the tablet 110, in a memory of the thermostat 10, on a component of the network 100 accessible in the structure, on a server, and/or on a storage device remote from the structure. It should be appreciated that the weekly schedule 204 may be stored in the form of a file (broadly, a schedule file), such that the file represents the weekly schedule 204. The user may enter and store a plurality of schedules in the same or similar manner, e.g., to specify additional and/or alternative cooling or heating configuration schedules, temperature setting(s) (e.g., set points, etc.) for cooling or heating configuration(s), automatic mode configuration schedules, temperature setting(s) (e.g., set points, etc.) for automatic mode configurations, to obtain schedules that differ as to particular times, dates, occupancy conditions, etc. In some embodiments, a thermostat user interface, e.g., the display screen 28 of the thermostat 10, may include a name indicator, e.g., a name as shown in the tablet name field 206, for a schedule that is currently in use by the thermostat 10.

In various embodiments, a plurality of schedules may be stored and individually selected by the user for activation on the thermostat 10 and/or other controller. In some example embodiments the user may arrange for an automatic schedule and/or configuration change, e.g., from a heating schedule to a predetermined cooling schedule, to be performed on a predetermined day, e.g., by an energy management services provider. The cooling schedule may be retrieved, e.g., from a server of the energy management services provider, and sent through the web portal 120 and the user's home network 100 to the thermostat 10, which then operates the user's cooling system using the retrieved cooling schedule. In some other example embodiments, the user may use a software application available, e.g., on the tablet 110 to program and execute an automatic change of schedule and/or configuration at a predetermined day and time. A replacement schedule thus may be retrieved automatically, e.g., from a cloud server and sent to the thermostat 10 to be used instead of (i.e., completely in place of) a currently used schedule on the thermostat 10.

In various embodiments a user may use one schedule, switch to another schedule, and quickly return to the previous schedule. The use of names to identify schedules can serve to minimize or at least reduce the time needed, e.g., to reinstitute a customized schedule, since that schedule need only be retrieved by name, e.g., from among a plurality of stored weekly schedules, where each weekly schedule includes, provides, etc. a plurality of daily time slots and temperature set points. Additionally or alternatively, in some implementations the user may have access to factory-set programs and/or schedules (e.g., factor-set weekly schedules, etc.) and/or may have access to user-customizable programs and/or schedules (e.g., user-customizable weekly schedules0, etc.) made available, e.g., by a climate control equipment manufacturer and/or energy management services provider. It should be noted that a plurality of weekly schedules could be specified and stored for selective use. For example, a user could specify and use more than one weekly heating schedule, more than one weekly cooling schedule, more than one weekly automatic mode schedule, schedules for various lengths of time (e.g., weekly schedules for various lengths of times, etc.), one or more "vacation" schedules, one or more schedules for a holiday period (e.g., where family is visiting and needs of an elderly parent need to be accommodated, etc.), etc. In this manner, it should again be appreciated that the schedules may be based on user-preferences independent of any particular season. Additionally, exemplary embodiments of the present disclosure make it quick and convenient for a user to specify and/or change schedules and/or particular elements in a particular schedule. Where a schedule can be displayed and specified on a computing device such as a smart phone, laptop or tablet, it is possible to provide various capabilities and features that could not be provided easily (if at all), e.g., on a typical thermostat's limited display.

One example method of scheduling operation of a climate control system comfort controller such as a thermostat is indicated generally in FIG. 4 by reference number 300. The method 300 is described in relation to weekly scheduling.

where a weekly schedule provides, includes, etc. a plurality of daily time slots and temperature set points (e.g., consistent with FIG. 3, etc.). The method 300 may be performed using a software application, which is made available, e.g., on a user computing device such as a smart phone or tablet in the same or similar manner as described above. In process 304, a user accesses the software application on the user computing device. In process 308, the user determines whether or not to use scheduling on the thermostat. If the user decides not to use scheduling, then the user may operate the thermostat in process 312 by selecting and setting set points, e.g., via the software application and/or locally on the thermostat. The thermostat applies such set points substantially immediately upon receiving them.

Where the user decides to use scheduling on the thermostat, in process 314 the user selects a climate control system configuration for which scheduling is to be performed. For example, the user may select heating, cooling, or an automatic mode in which, e.g., heating operation is automatically changed to cooling operation, and vice versa, dependent on sensed temperature in the structure in which climate control is being provided. In process 316 it is determined whether the user wishes to use multiple weekly schedules for a single configuration of the climate control system or for a mode (e.g., an automatic mode, etc.) involving multiple configurations of the climate construction system, e.g., multiple schedules for a heating configuration and/or multiple schedules for a cooling configuration. If the user decides not to use multiple weekly schedules, then in process 320 the user may set up a single weekly schedule (having a plurality of daily time slots and temperature set points (e.g., consistent with FIG. 3, etc.), etc.), which may be sent to the thermostat (e.g., in the form of a schedule file, etc.), whereupon the thermostat is operable to completely replace a current operating schedule (e.g., a current operating weekly schedule) or mode of operation (e.g., a constant temperature operation mode, etc.) on the thermostat with the received single schedule and to perform climate control according to the single schedule. In connection therewith, where the single weekly schedule is stored and/or sent to the thermostat in the form of a schedule file, it should be appreciated that the thermostat may use the schedule file for the single weekly schedule in place of (i.e., in complete place of) a schedule file for a current operating schedule (e.g., a schedule file for a current operating weekly schedule) or mode of operation on the thermostat.

Where the user decides to use multiple schedules for one or more configurations (e.g., multiple schedules for a heating configuration, multiple schedules for a cooling configuration, or multiple schedules for an automatic mode, including both a heating configuration and a cooling configuration), in process 324 it is determined whether the user wishes to add a new schedule, e.g., to schedule(s) previously stored for the one or more configurations. If the user wishes to add a new schedule, in process 328 the software application requests user input of a name for the new schedule. In various implementations, a user may modify a copy of a previously stored schedule and store the modified copy as a new schedule having a new name, while retaining the schedule from which the copy was made. In process 332, it is determined that the user wishes to modify an existing schedule. Addition of new schedules and modification of existing schedules both entail user selection of schedule settings, including time settings (e.g., daily time slots, etc.) and temperature settings (e.g., temperature set points, etc.), such that the user may specify a plurality of time settings and temperature settings for a weekly schedule.

In process 336, the user selects and stores time and/or temperature setting(s) for one or more user-selected days of a week. In process 340, the finished schedule is saved, e.g., on a server and/or the user computing device, for possible future use in operating the thermostat (e.g., to replace a current operating weekly schedule of the thermostat, etc.). If it is determined in process 342 that the user has elected to run the finished schedule on the thermostat, then in process 344 the computing device selects and transmits the finished schedule to the thermostat to completely replace a current operating schedule (e.g., a currently operating weekly schedule) or mode of operation (e.g., a constant temperature operation, etc.) on the thermostat, which uses the finished weekly schedule as the new running schedule, such that the finished, new weekly schedule completely replaces the current operating schedule or mode of operation on the thermostat.

In various embodiments, a software application allows a user to perform comfort controller scheduling using a touch screen of a user computing device. In the present example embodiment, the user computing device is a tablet having a touch screen, although a smart phone or other computing device could be used in other embodiments. An example sequence of displays and selections is described with reference to the figures. It can be seen, however, that various alternative or additional display and selection sequences are possible using various selection options.

Figure 5B:
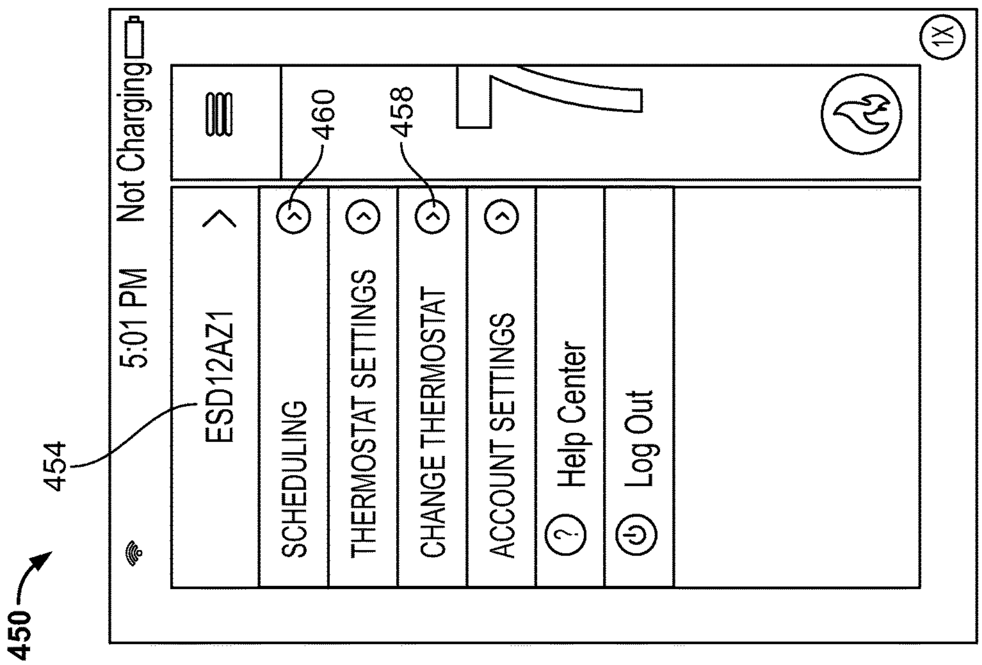
Figure 5A:
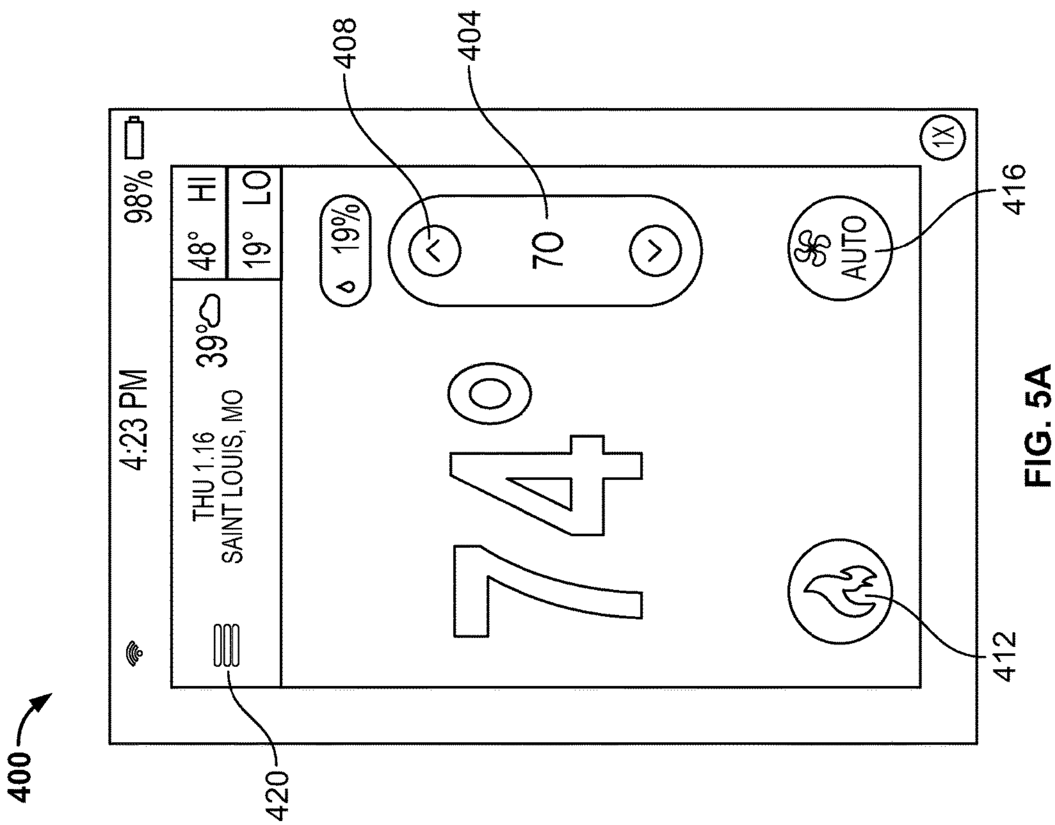

Referring now to the figures, FIG. 5A illustrates a main control screen 400 displayed by the software application on the tablet touch screen, for use in controlling the user's thermostat. The control screen 400 provides various types of information pertaining to premises where the thermostat is located, including but not necessarily limited to current premises temperature and humidity, current date, time, location and weather information, and a current temperature set point indicator 404 (70 degrees in the present example) that can be increased or decreased by activating arrow indicators 408 above and below the set point indicator 404. A climate control system configuration selector 412 and a fan setting selector 416 also are provided, by which the user may, e.g., remotely change configuration and/or fan settings on the thermostat.

The user may touch three horizontal bars 420 at the upper left of the screen shown in FIG. 5A to display a screen, e.g., as indicated by reference number 450 in FIG. 5B. In various embodiments, the software application may be used on the user computing device to control more than one thermostat and/or other type of comfort controller. Thus, for example, a user may use the same touch screen tablet or smart phone to control multiple thermostats, e.g., at the user's home, vacation house, office, etc. A thermostat name 454 ("ESD12AZ1" in the present example) for the thermostat currently being controlled is displayed near the top of the screen 450. In some embodiments, to select another thermostat for scheduling (e.g., weekly scheduling, etc.) and/or activating other types of control, the user may activate a "Change Thermostat" arrow 458 to display information and screen activation areas for selecting another thermostat.

Figure 5D:
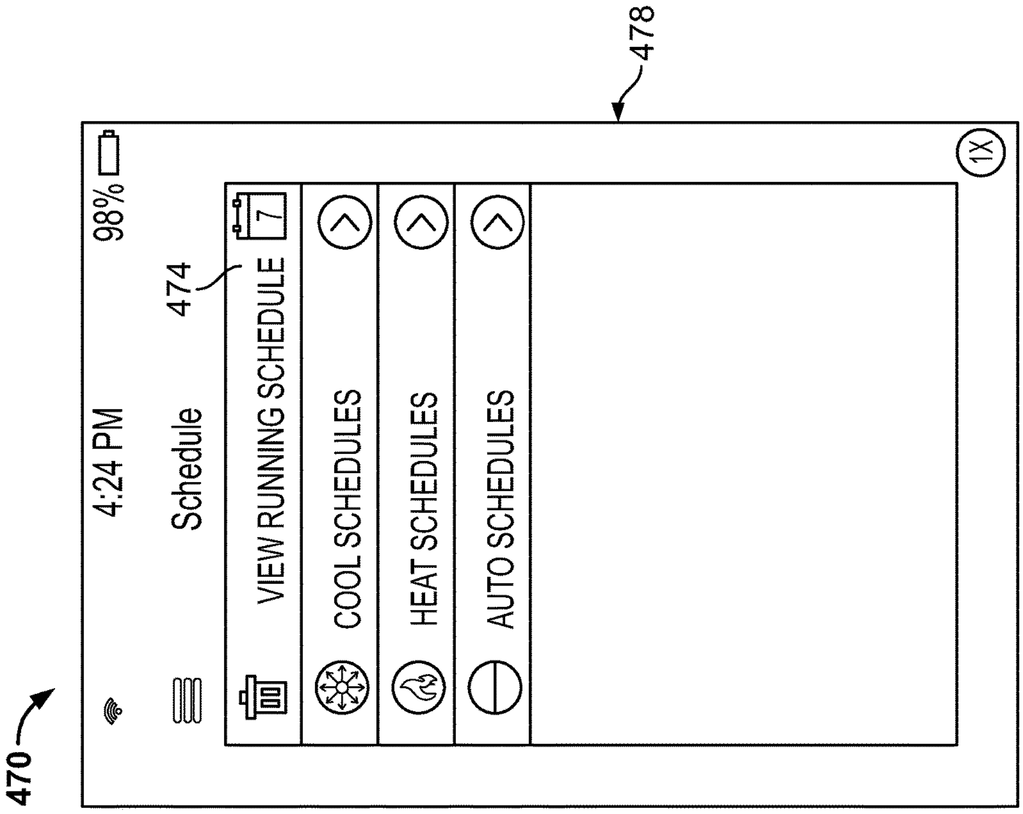
Figure 5C:
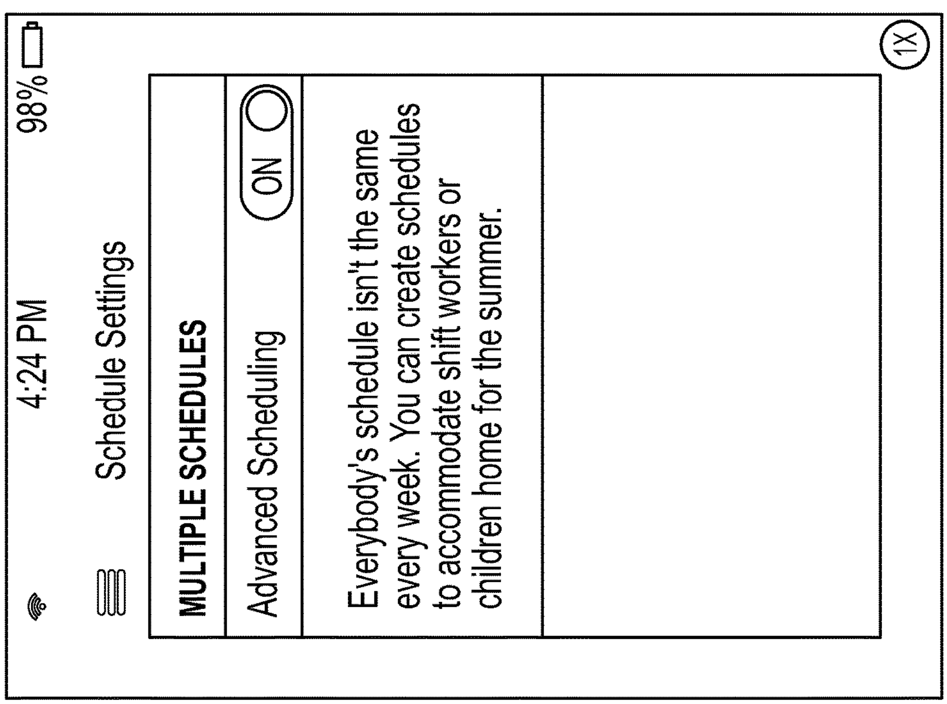

The user may activate a "Scheduling" arrow 460 on the screen 450, e.g., to display one or more screens, e.g., as shown in FIG. 5C, providing the user with options for editing multiple weekly schedules for the thermostat, where each schedule provides, includes, etc. a plurality of daily time slots and temperature set points. In some embodiments, a screen may be displayed, e.g., as shown in FIG. 5D. On a screen 470 the user may activate a "View Running Schedule" selector 474 to view the schedule currently in effect on the thermostat for a selected number of days (in the present example, seven days.) In various other embodiments, a user may selectively change the length of a schedule (in days, hours, minutes, etc.). The screen 470 also displays mode selector arrows 478 whereby the user may select a type of schedule to edit and/or create.

In the present example embodiment, a plurality of schedules may be created and stored, e.g., for each of a plurality of climate control system configurations. Thus, the user may choose, e.g., to edit cooling, heating and/or automatic mode weekly schedules previously created by the user, where each weekly schedule provides, includes, etc. a plurality of daily time slots and temperature set points. Additionally or alternatively, various heating, cooling and/or automatic-mode schedules for the climate control system configuration(s) may have been preset and stored, e.g., by a manufacturer of the thermostat, at a remote server and made available for selection by the user via the computing device and software application. In various embodiments, the user may edit factory-preset schedules for use in addition to, and/or instead of, user-provided schedules.

Figure 5F:
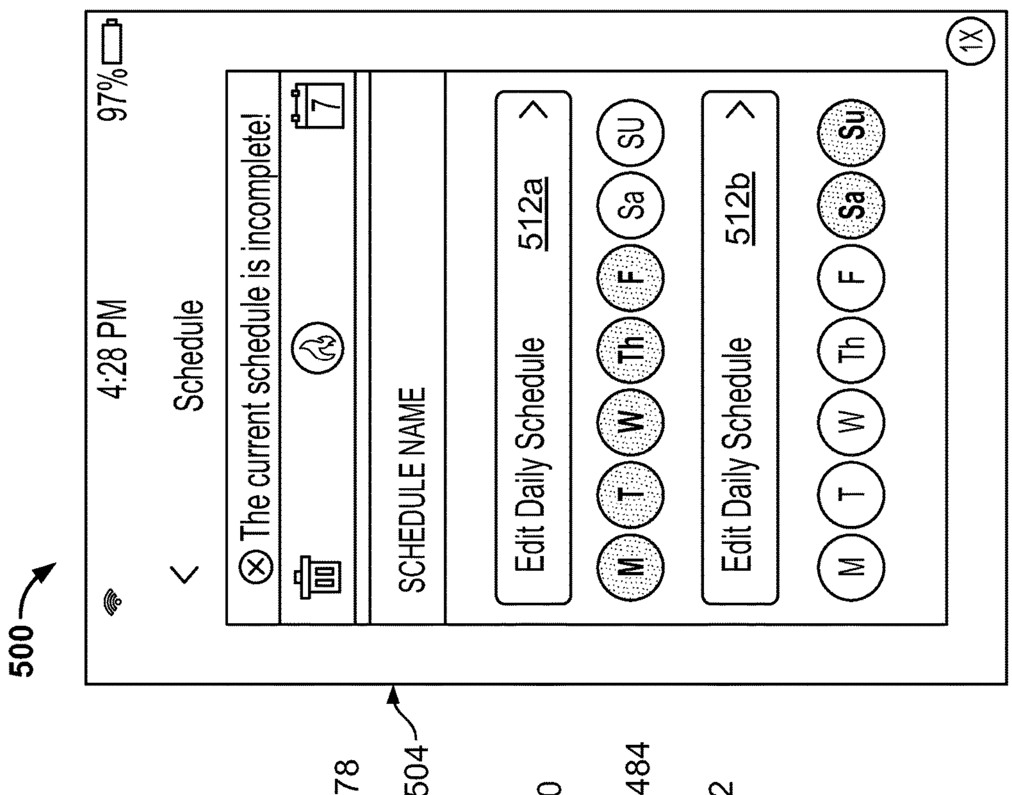
Figure 5E:
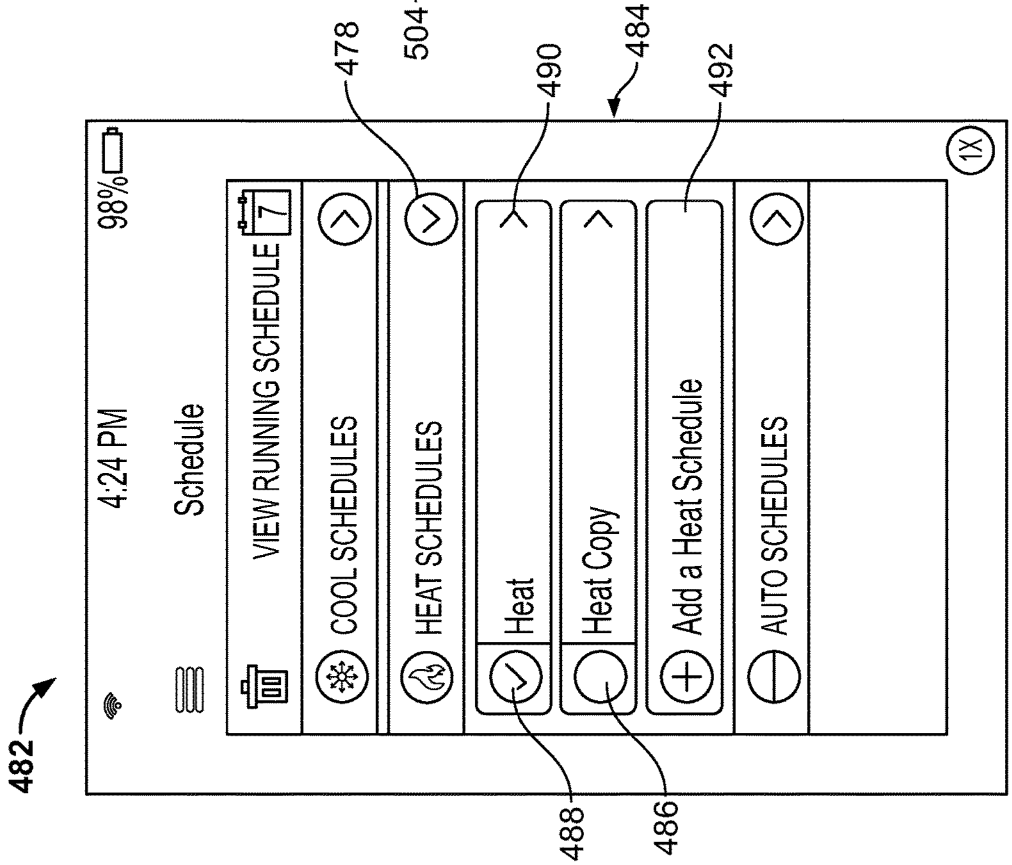

In the present example embodiment, the user wishes to edit heat schedules. When the user activates the arrow 478 for "Heat Schedules," a screen 482 may be displayed, e.g., as shown in FIG. 5E. The user may select a weekly heat schedule 484 from among weekly heat schedule(s) 484 listed beneath the "Heat Schedules" arrow 478. In the present example, weekly heat schedules 484 named "Heat" and "Heat copy" are listed. The user may select a weekly schedule 484 to be the currently running schedule, by touching a circle 486 to the left of the schedule name, whereupon a check mark 488 is displayed in the circle 486 to indicate the selection. In the present example, the weekly "Heat" schedule 484 is indicated by a check mark 488 as the currently running schedule. To edit one of the listed weekly schedules 484, the user may activate a corresponding arrow 490. The same or similar options are available for selecting and/or editing weekly cooling schedules(s) and/or weekly automatic mode schedules.

Figure 5G:
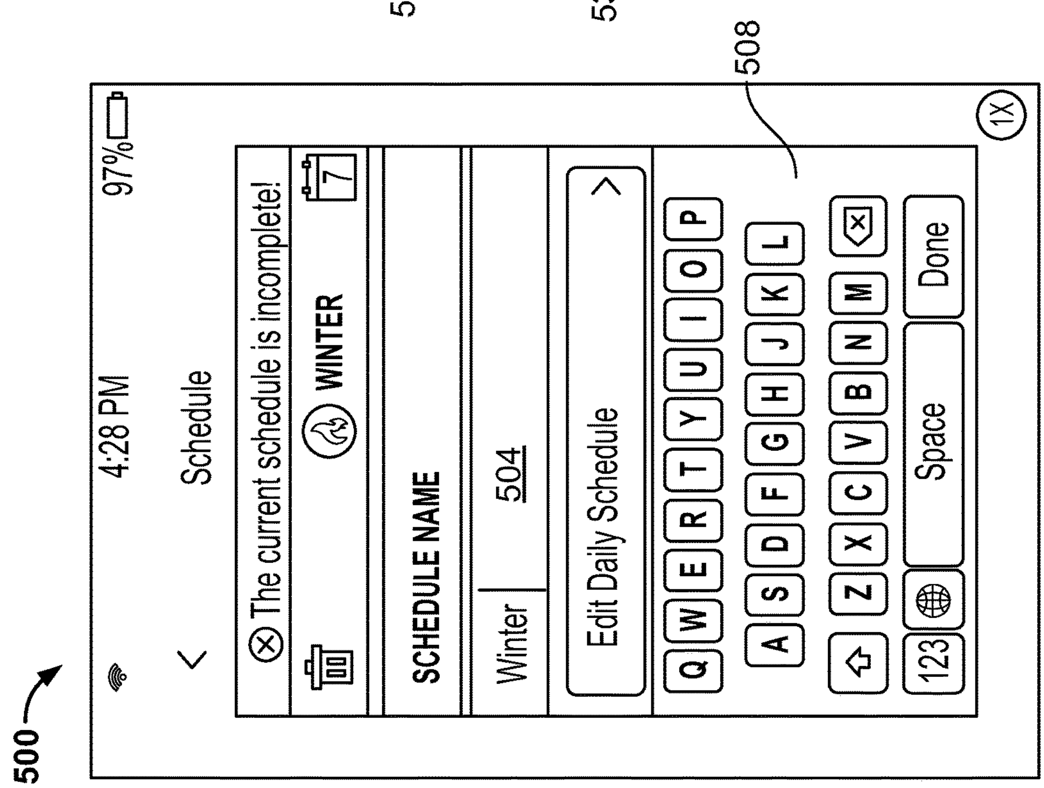

Also provided in the screen shown in FIG. 5E is an "Add a Heat Schedule" option 492. In the present example, the user wishes to add a new weekly heating schedule and so activates the "Add a Heat Schedule" option 492. In some embodiments, e.g., as shown in FIG. 5F, a screen 500 may be displayed. The user may touch a "SCHEDULE NAME" option 504 to activate a pop-up keyboard 508, e.g., as shown in FIG. 5G. The user may enter a name for the new weekly schedule on the screen 500. In the present example, the name of the new schedule is "Winter." The name, however, may not necessarily be related to a season, whereby the name may be independent of the season.

For example, a schedule may be related to a particular season, time of year, event, time of day, etc. A schedule may also be related to a particular person. For example, if only one person is anticipated to be home during a given period of time, that person might have his or her own schedule that is invoked when that person is the only one home. As another example, a schedule may be related to a particular event. For example, the schedule may then have settings for a get-together or party where the settings for heat may, for example, be a few degrees higher or perhaps lower if there will be many people attending the event. As a further example, the event may be a vacation, where the schedule is selected as a function of time when no one is anticipated to be home. As yet another example, the schedule may be related to a holiday period. For example, the schedule may have time and temperature settings to accommodate the needs of an elderly parent that is visiting over the holiday. In various embodiments, flexibility is provided for creating and applying various schedules to comfort controllers, and so a user may select a name as may be desired to easily identify a given schedule.

A user may enter times and temperature set points for a weekly schedule in the following exemplary manner, such that the weekly schedule includes, provides, etc. a plurality of daily time slots and temperature set points. Referring again to FIG. 5F, the screen 500 includes "Edit Daily Schedule" options 512*a* and 512*b* whereby user specifications for scheduling particular days of the week may be entered. In the present example embodiment, options 512*a* and 512*b* are provided respectively for editing a weekly schedule that includes a weekday schedule and a weekend schedule. In various other embodiments, a user may have other or additional editing options, e.g., in relation to time periods shorter and/or longer than one week.

Figure 5H:
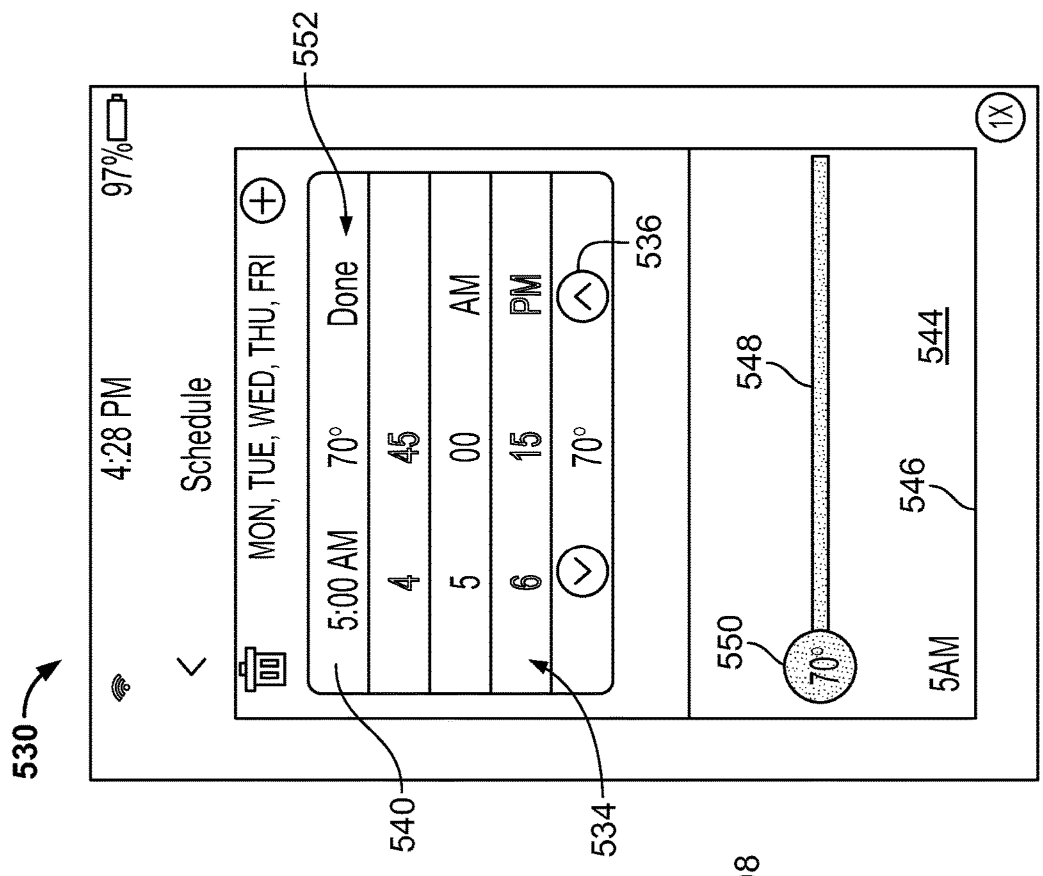

After the user has entered the schedule name and touched, e.g., the "Edit Daily Schedule" option 512*a*, a screen 530 may be displayed, e.g., as shown in FIG. 5H, whereby the user may enter one or more times and set point temperatures for the weekdays Monday through Friday. In various implementations, the user may use the touch screen to display time and temperature and to change the displayed values to desired values. In the present example, and as shown in FIG. 5H, a scroll display 534 shows a user-selected time of 5:00 am and temperature set point of 70 degrees selected via directional arrows 536. The selected values also are displayed as text in an upper portion 540 of the screen 530 and graphically in a lower portion 544 of the screen 530. In the graphic representation, and as further described below, a time line 546 is provided across the lower portion 544 and one or more set-point temperature lines 548 are displayed above the time line 546. The temperature set-point line 548 includes a set-point indicator 550.

When the user has selected a time and temperature set point, he/she may touch a "Done" option 552. In the present example, when the user has selected the time of 5:00 am and temperature set point of 70 degrees and touched "Done" 552, the selected time and temperature set point are confirmed as having been entered in relation to the new weekly schedule. For example, the entered values may be displayed, e.g., in a specific color, so as to confirm that the selected time and temperature set point were entered in relation to the new weekly schedule.

Figure 5I:
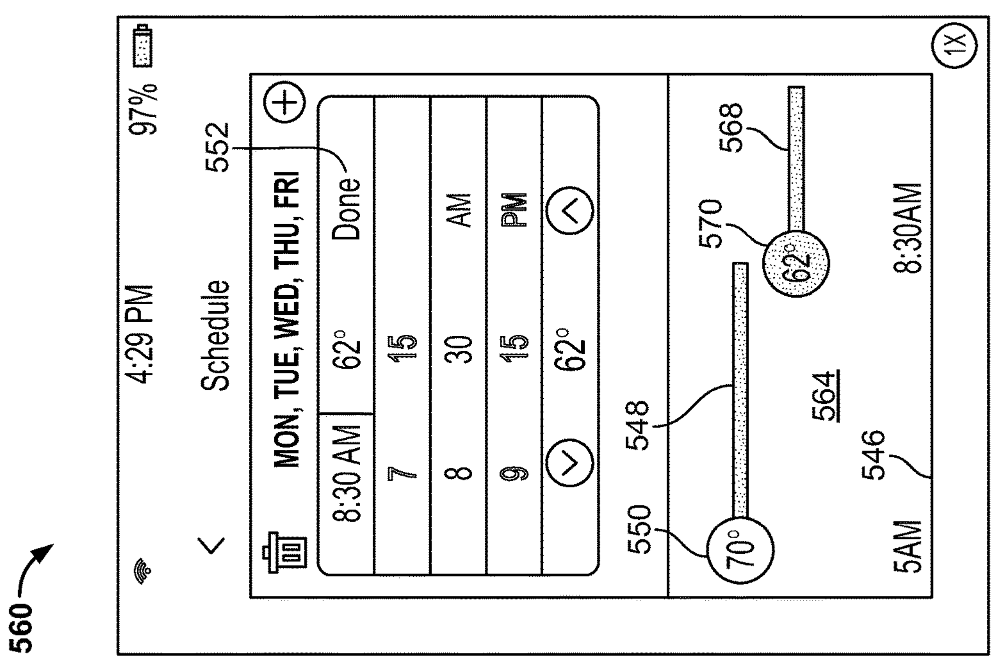

The user may display one or more screens to select additional time(s) and/or temperature set point(s) for the weekdays Monday through Friday. In the present example embodiment, and as shown in FIG. 5I, a screen 560 is displayed whereby the user again may scroll displays of time and set-point temperature to desired values, which are displayed graphically in the lower portion 564 of the screen 560. In the present example, the user selects the time of 8:30 am and temperature set point of 62 degrees. A second set point temperature line 568 having a set-point indicator 570 for the newly selected 62-degree temperature set point is displayed relative to the time line 546, with the second selected time of 8:30 am displayed on the time line 546. The color of the set-point indicator 550 has changed from that shown in the screen 530, thereby confirming that the 70-degree set-point has been entered in relation to the new schedule. The background color and color of the temperature set point indicator 570 have been returned to colors previously shown in FIG. 5H, to indicate that the second time and temperature set point are not yet confirmed by the user. As previously described, when the user touches the "Done"

option 552, the selected time and temperature set point are confirmed as having been entered in relation to the new weekly schedule.

Figure 5J:
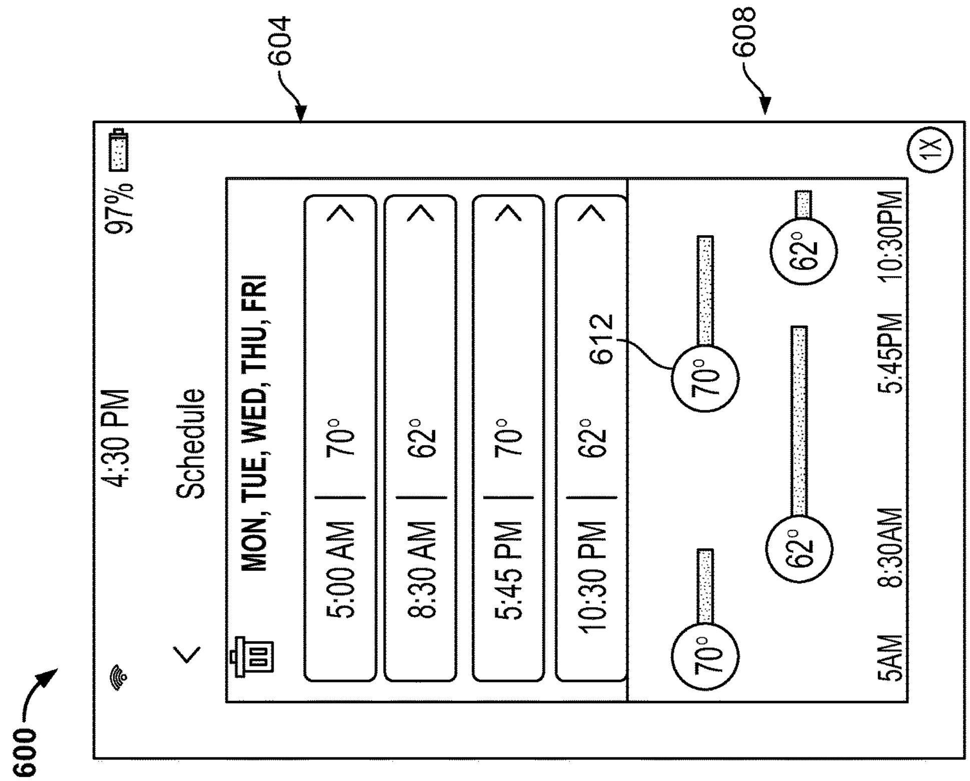

The graphic display of temperature set point lines relative to one another is useful in showing the relationships between time and temperature over a given day. Additional times and set point temperatures may be selected and confirmed as previously described. In the present example, the user selects two additional temperature-set point combinations for Monday through Friday. The four selected temperature-set point combinations may be displayed e.g., as shown in FIG. 5J in a screen 600. The selected time and temperature set points are displayed as text in an upper portion 604 of the screen and also as a graphic display 608. In the graphic display 608, background color and the color of indicators 612 for the selected temperature set points indicate that the selected time and temperature set points have been entered in relation to the new schedule.

In various embodiments, a user may enter fewer than, or more than, four time and temperature set point combinations for any given day or group of days. It should be noted also that various color distinctions, graphic indicators, screen layouts, etc. could be used in various displays provided for performance of the various functions and capabilities described in the present disclosure and claims. Additionally, embodiments are not necessarily limited to use of visual displays and/or touch screens. Various aspects of the disclosure could be implemented in relation to various computing devices and user interfaces, which could include elements that are visual, aural, haptic, combinations of the foregoing, etc.

In the present example, when the user has finished scheduling the weekdays Monday through Friday, the user may select and enter time(s) and temperature set point(s) for Saturday and Sunday, e.g., in the same or a similar way as previously described for weekdays. It should be noted that a user may enter more than two, or less than two, different sets of time/temperature set point specifications for a given weekly schedule. In some other embodiments a user may wish to schedule more than the typical Monday-Friday and Saturday-Sunday times and set points. A user, for example, may wish to enter time/temperature set point specifications for Tuesdays and Thursdays that are different from those for Mondays and Wednesdays. Accordingly the user may, e.g., scroll up the display of the screen 500 (shown in FIGS. 5F and 5G) to obtain an additional "Edit Daily Schedule" area. The user may then touch the buttons "T" and "Th" in the additional "Edit Daily Schedule" area to move Tuesday and Thursday from the Monday-Friday "Edit Daily Schedule" area 512*a* into the additional "Edit Daily Schedule" area. The user may then schedule the days of the week as previously described, but in three instead of two groups of days.

Figure 5L:
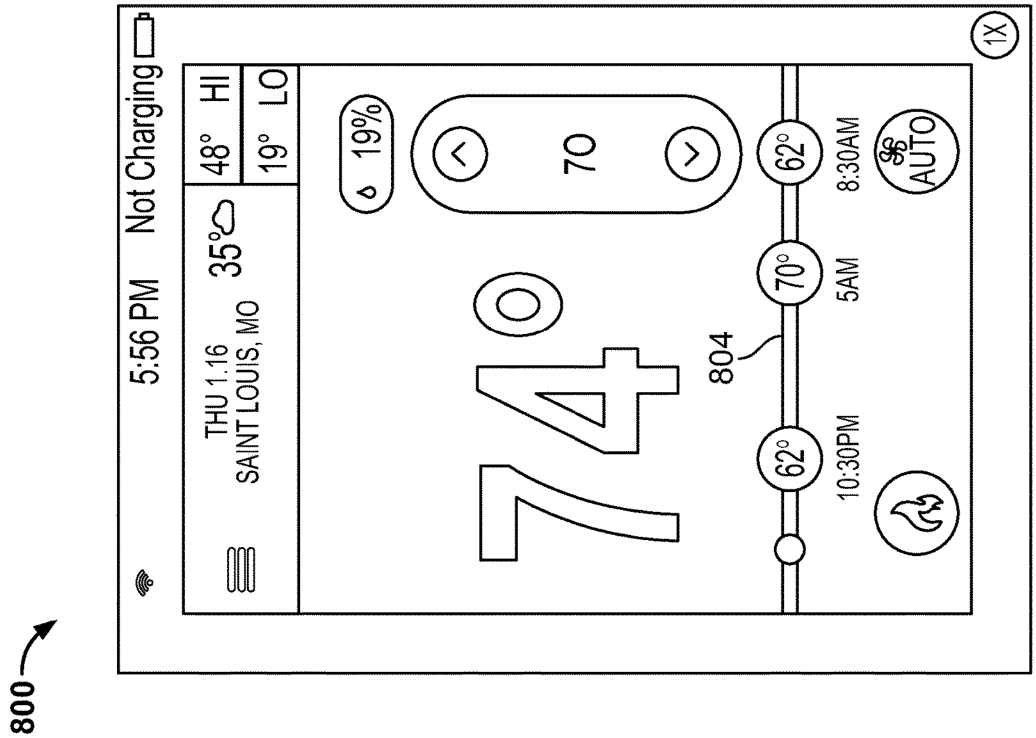
Figure 5K:
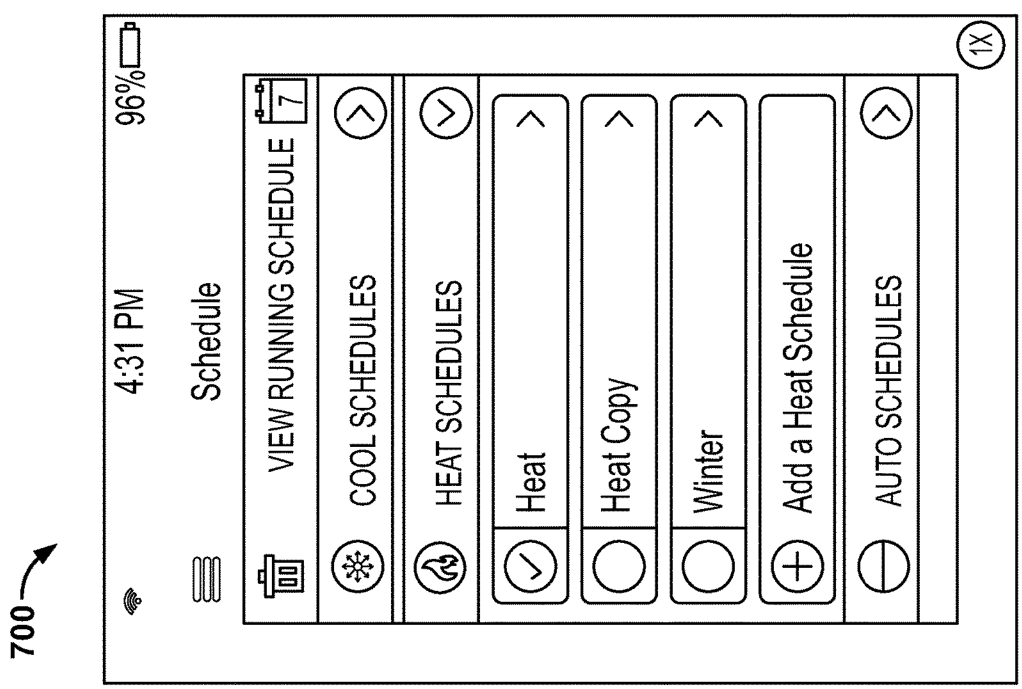

Returning to the present example, when the user has finished scheduling Saturday and Sunday, the user may cause a screen to be displayed, e.g., as shown in FIG. 5K. A screen 700 is similar to the screen 482 of FIG. 5E, with the addition of "Winter" displayed as one of the heat schedules 484. The user may select "Winter" as the currently invoked schedule, e.g., by touching the circle 486 to the left of the name "Winter" on the screen 700. In various embodiments and as previously discussed with reference to FIG. 5B, the software application may be used for controlling more than one thermostat. A main control screen 800 for the thermostat currently being controlled may be displayed, e.g., as shown in FIG. 5L. The currently running "Winter" schedule is displayed as a band 804 across the lower portion of the screen. It should be noted that no currently running schedule is displayed in the main control screen 400, previously discussed with reference to FIG. 5A, the screen 400 having been displayed by the computing device before scheduling was switched on.

In some embodiments, a stored schedule may be selected and transmitted to a thermostat or other comfort controller, e.g., in the home of a user, based on a distance and/or location of the user relative to the home. For example, referring to FIG. 2, a Global Positioning System (GPS) or other application on or available to the smart phone 108 or other computing device may wirelessly transmit a geographic location of the device, for use, e.g., in a geo-fencing application. In one example embodiment, the user may specify and store a schedule for use, e.g., when the user leaves home with the smart phone 108 and/or is headed toward a predetermined work location, and/or for use when the smart phone 108 is detected as leaving the work location and moving toward the home. Such schedules can make it possible, e.g., to gradually modify temperatures in the home so as to reduce energy consumption while achieving a desired comfort level by the time the user arrives home. Such schedules may be stored, e.g., on a smart phone or other computing device, a remote server, a comfort controller, a home router or other home network component, etc. and may be automatically transmitted to a comfort controller based on the user's location and/or distance from the home. Reference is made, e.g., to systems and methods described in commonly assigned U.S. Pat. No. 8,718,826, the disclosure of which is incorporated herein by reference in its entirety.

As can be appreciated from the above, various aspects of exemplary embodiments include a comfort controller operable to control one or more configurations of a climate control system for providing climate control in a structure in accordance with a user-selected one of a plurality of stored weekly schedules for operation of the one or more configurations, where each of the plurality of stored weekly schedules provides a plurality of daily time slots and temperature set points and is based on user-specifications, and where the user-selected weekly schedule is wirelessly received by and completely replaces a current operating weekly schedule on the comfort controller.

Various aspects of exemplary embedment also include an apparatus for providing climate control in a structure, the apparatus comprising: a wireless-capable comfort controller operable to control at least a first configuration of a climate control system; and a computing device capable of wireless communication with the comfort controller and having a user interface for receiving user specifications in relation to operation of the comfort controller to control the first configuration; wherein the computing device is operable to store the received user specifications in relation to first and second weekly schedules for operation of at least the first configuration, each schedule including a plurality of daily time slots and temperature set points and selectively retrievable and wirelessly transmissible to the comfort controller to completely replace a weekly schedule currently in use by the comfort controller to control at least the first configuration, whereby the comfort controller is selectively configurable to control at least the first configuration of the climate control system using either the first weekly schedule or the second weekly schedule.

Various aspects of exemplary embodiments further include a computer-performed method of providing climate control in a structure, the method comprising: receiving, via a user interface of a computing device, user specifications for control by a comfort controller of a climate control system of the structure, the user specifications including a plurality of daily time slots and temperature set points; storing first and second sets of user specifications in relation to first and second weekly schedules for operation by the comfort controller of at least a first configuration of the climate control system, each of the first and second weekly schedules associated with a name, and the first and second weekly schedules including the plurality of daily time slots and temperature set points received via the user interface; and in response to a user selection of one of the stored first and second weekly schedules, retrieving the selected weekly schedule based on the name associated with the selected schedule and transmitting the selected weekly schedule to the comfort controller to completely replace a weekly schedule currently in use by the comfort controller to control at least the first configuration, whereby the comfort controller uses the selected weekly schedule in place of a weekly schedule currently in use by the comfort controller to control at least the first configuration.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A comfort controller operable to control one or more configurations of a climate control system for providing climate control in a structure in accordance with a user-selected one of a plurality of stored weekly schedules for operation of the one or more configurations, where each of the plurality of stored weekly schedules provides a plurality of daily time slots and temperature set points and is based on user-specifications, and where the user-selected weekly schedule is wirelessly received by and completely replaces a current operating weekly schedule on the comfort controller; wherein the comfort controller is operable to receive the user-selected weekly schedule from a computing device configured to:

retrieve a previously stored weekly schedule;

receive a user specification modifying the retrieved previously stored weekly schedule; and store the modified weekly schedule as the previously stored weekly schedule or as a third weekly schedule.

2. The comfort controller of claim 1, operable to receive the user-selected weekly schedule from a computing device remote from the structure.

3. The comfort controller of claim 1, wherein at least a portion of the user-selected weekly schedule is displayable on at least the comfort controller and/or modifiable via a user interface of a computing device.

4. The comfort controller of claim 1, comprising a thermostat.

5. The comfort controller of claim 1, selectively operable to control one of the following in accordance with the user-selected one of the stored weekly schedules: a heating configuration, a cooling configuration, and an automatic mode including heating and cooling configurations.

6. The comfort controller of claim 1, further comprising a network interface through which the comfort controller is selectively operable to control the one or more configurations using a first weekly schedule user-selected for operating the one or more configurations from among the plurality of stored weekly schedules, where the first weekly schedule is received by the comfort controller via the network interface;

the comfort controller further selectively operable to completely replace the first weekly schedule with a second weekly schedule user-selected from among the plurality of stored weekly schedules and control the same one or more configurations using the second weekly schedule, independent of a season.

7. The comfort controller of claim 6, where each of the plurality stored weekly schedules is stored in the form of a schedule file and where the weekly schedule file for the user-selected weekly schedule is wirelessly received by the comfort controller and is used in place of a schedule file for a current operating weekly schedule on the comfort controller.

8. An apparatus for providing climate control in a structure, the apparatus comprising:

a wireless-capable comfort controller operable to control at least a first configuration of a climate control system; and a computing device capable of wireless communication with the comfort controller and having a user interface for receiving user specifications in relation to operation of the comfort controller to control the first configuration;

wherein the computing device is operable to store the received user specifications in relation to first and second weekly schedules for operation of at least the first configuration, each schedule including a plurality of daily time slots and temperature set points and selectively retrievable and wirelessly transmissible to the comfort controller to completely replace a weekly schedule currently in use by the comfort controller to control at least the first configuration, whereby the comfort controller is selectively configurable to control at least the first configuration of the climate control system using either the first weekly schedule or the second weekly schedule;

wherein the computing device is further configured to:

retrieve a previously stored weekly schedule;

receive a user specification modifying the retrieved previously stored weekly schedule; and store the modified weekly schedule as the previously stored weekly schedule or as a third weekly schedule.

9. The apparatus of claim 8, further comprising a second comfort controller, and wherein the computing device is configured to store user specifications in relation to at least one weekly schedule selectively transmissible to the second comfort controller whereby the second comfort controller is selectively configurable to perform climate control system control using the at least one weekly schedule.

10. The apparatus of claim 8, wherein the comfort controller comprises a thermostat, and/or at least one of the first and second weekly schedules is selectively retrievable and wirelessly transmissible to the comfort controller based on a distance and/or location of a location reporting device relative to the structure.

11. The apparatus of claim 8, wherein the computing device is configured to store the first and second weekly schedules in one or more of the following: the computing device, a remote server, the comfort controller, and a component of a network accessible in the structure.

12. The apparatus of claim 8, wherein the computing device comprises one or more of the following: a smart phone, a laptop computer, a personal computer (PC), a tablet, and a server.

13. The apparatus of claim 8, where the user specifications include one or more of the following: a schedule, a time setting, a set-point setting, a configuration, and a mode.

14. The apparatus of claim 8, wherein the previously stored weekly schedule comprises a weekly schedule provided as a factory preset.

15. A computer-performed method of providing climate control in a structure, the method comprising:

receiving, via a user interface of a computing device, user specifications for control by a comfort controller of a climate control system of the structure, the user specifications including a plurality of daily time slots and temperature set points;

storing first and second sets of user specifications in relation to first and second weekly schedules for operation by the comfort controller of at least a first configuration of the climate control system, each of the first and second weekly schedules associated with a name, and the first and second weekly schedules including the plurality of daily time slots and temperature set points received via the user interface; and in response to a user selection of one of the stored first and second weekly schedules, retrieving the selected weekly schedule based on the name associated with the selected schedule and transmitting the selected weekly schedule to the comfort controller to completely replace a weekly schedule currently in use by the comfort controller to control at least the first configuration, whereby the comfort controller uses the selected weekly schedule in place of a weekly schedule currently in use by the comfort controller to control at least the first configuration;

wherein the method further comprises:

retrieving a previously stored weekly schedule;

receiving a user specification modifying the retrieved previously stored weekly schedule; and storing the modified weekly schedule as the previously stored weekly schedule or as a third weekly schedule.

16. The method of claim 15, performed at least in part by one or more of the following: a smart phone, a laptop computer, a personal computer (PC), a tablet, and a server.

17. The method of claim 15, further comprising retrieving and sending a schedule to the comfort controller via one or more of the following: the Internet, a website, a server remote from the comfort controller, a component of a network accessible in the structure, and the computing device.

18. The method of claim 15, further comprising:

receiving, via the user interface, user input associating the one or more received specifications with the first and/or second weekly schedules; and displaying, via the user interface, at least one or more portions of the first and/or second weekly schedules.

19. The method of claim 15, wherein:

the comfort controller includes a thermostat; and/or at least one of the first and second schedules is independent of a season, whereby the comfort controller uses the selected weekly schedule in place of the weekly schedule currently in use by the comfort controller to control at least the first configuration independent of the season.

* * * * *